United States Patent [19]

Tzeng

[11] 4,392,046
[45] Jul. 5, 1983

[54] ELECTRONIC DEVICE FOR ARC WELDING EQUIPMENT

[76] Inventor: Huann-Jang Tzeng, No. 78, Shu-Jen Rd., Pen-Tang Tsuen, Wu-Feng Hsiang, Taichung Hsien, Taiwan

[21] Appl. No.: 247,867

[22] Filed: Mar. 26, 1981

[51] Int. Cl.³ ............................................. B23K 9/10
[52] U.S. Cl. ............................. 219/130.1; 307/252 T
[58] Field of Search ..................... 219/130.1; 323/324, 323/325; 307/252 T

[56] References Cited

U.S. PATENT DOCUMENTS 3,284,666 11/1966 Hajicek ........................... 307/252 T
4,031,458 6/1977 Ichikawa ........................ 307/252 T

FOREIGN PATENT DOCUMENTS 2130335 12/1972 Fed. Rep. of Germany ... 219/130.1

Primary Examiner—C. C. Shaw
Attorney, Agent, or Firm—Eric T. S. Chung

[57] ABSTRACT

The present invention concerns an electronic voltage regulating device applied to electrical appliances, and more particularly, arc welding equipment comprising a voltage regulating portion having two SCRs alternately turned on and off by a controlling portion having a RC circuit, a DIAC and a TRIAC which is operationally characterized by the DIAC being triggered during each half cycle when the capacitor is charged to a predetermined potential by the application of alternating current, the DIAC then triggering the TRIAC, which in turn enables the gate of one of the two SCRs in each half cycle to turn the SCR on and allow current to pass through the load for the remainder of the half cycle, thus controlling the operable power by means of controlling the conducting phase angle through the adjustment of the RC value or the choice of the DIAC.

4 Claims, 4 Drawing Figures

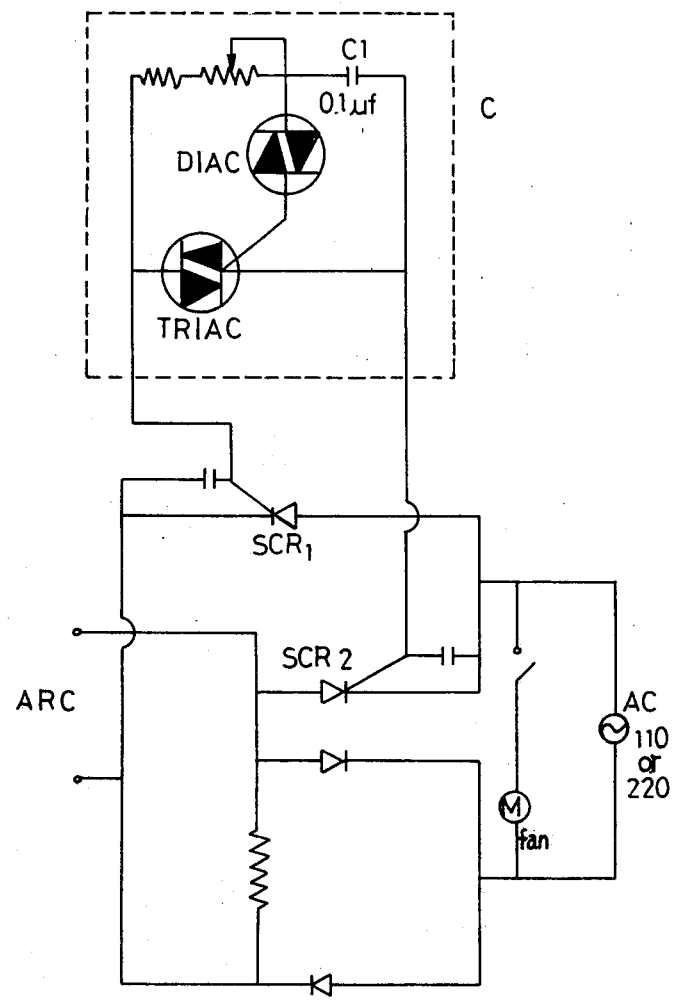
F I G. 3A

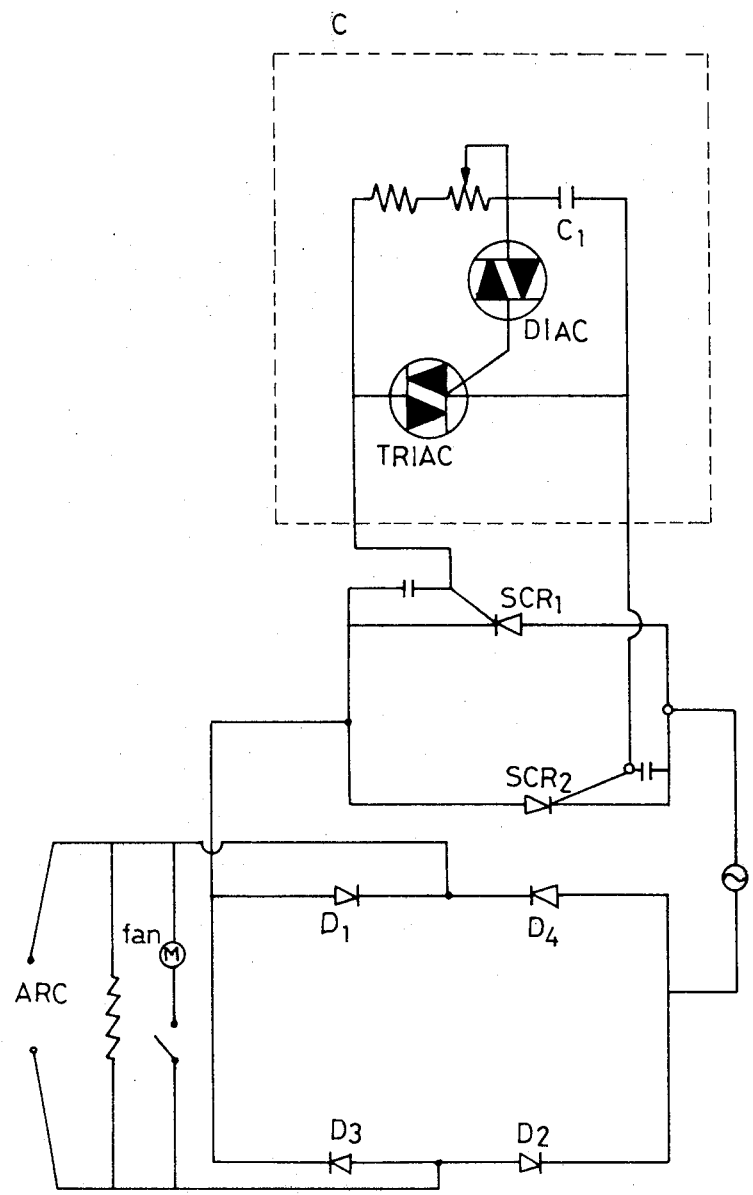
F I G. 3B

ELECTRONIC DEVICE FOR ARC WELDING EQUIPMENT

BACKGROUND OF THE INVENTION

Ever since the attention of the people in the world was drawn to the aggravating energy crisis, the trend of the development of new appliances has appeared to be chiefly oriented toward the minimization of power consumption and the enhancement of efficiency. However, conventional arc welding equipment is almost exclusively of the transformer type and is altogether unsatisfactory in view of this trend. Additionally, apart from low efficiency, conventional transformer type arc welding equipment suffers several disadvantages.

Firstly, transformers structurally involve laminated silicon steel and copper coils which render the resulting layout rather bulky and cumbersome, therefore decreasing the portability, and convenience in operation of the welding equipment. Nextly, an apparent drawback of conventional AC arc welding equipment is that the accessible range of welding is restricted to a shallow depth inward from the surface of a workpiece, and fails to reach significantly into the depth thereof. In other words, conventional equipment can only melt through relatively thin metal plate.

In welding thick plate, the processed portion of the workpiece has to be properly "shaved" to facilitate the work, otherwise, the resulting weld would be poor. At the end of welding, the previously shaved portion must be filled up with flux. This requires much labor and filler material.

Furthermore, the apparatus is always consuming power even if the arc is not at work, unless the power source is cut off. Thus in intermittant operation, the welding equipment continues to consume electricity even between two successive weld operations. Also, a considerable amount of electricity is converted into useless heat, which requires the use of fans to dissipate the heat. As a result, efficiency is rather low. This is a noticeable defect in view of the power-saving trend of the development of all facilities nowadays.

Another kind of welding equipment developed to mitigate the drawbacks of yet known AC welding equipment, namely DC welding equipment, which is provided with a bridge rectifier to allow both the positive and negative phases of alternating current applied thereto to pass in one direction, can achieve a better reach of operable depth, and by using this, the so called "shaving" can be dispensed with. However, since coil and core transformers are still used (a typical example is illustrated in FIG. 1) the size of the resulting assembly is still inconveniently large. Moreover, the undesireable continuous consumption of power during intermittant work is still inevitable.

OBJECTS AND SUMMARY OF THE INVENTION

Accordingly it is an object of the present invention to provide a device to supply the power for electric appliances, particularly arc welding equipment, whereby the aforesaid disadvantages can be effectively obviated.

Briefly described, the present invention involves an improved electronic voltage regulating device for use with arc welding equipment.

More particularly, the subject invention includes an electronic circuit which eliminates the need for using a transformer as is necessary with conventional units. A pair of thyristors are alternately triggered under control of a control circuit including a RC circuit, a DIAC, and a TRIAC to which alternating current is applied. Charging of the capacitor to a predetermined level, causes the DIAC and subsequently the TRIAC to be triggered on. The gates of the thyristors are hence alternately enabled and the flow of current to the load (arc) is produced. DC welding is readily accomodated by generally connecting a rectifier bridge in series with the thyristors.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 3A is a schematic diagram illustrating the present invention as applied to DC welding equipment; and FIG. 3B is a schematic diagram illustrating a further improved alternative of the embodiment of FIG. 3A.

DESCRIPTION OF THE PREFERRED EMBODIMENT

Figure 2:
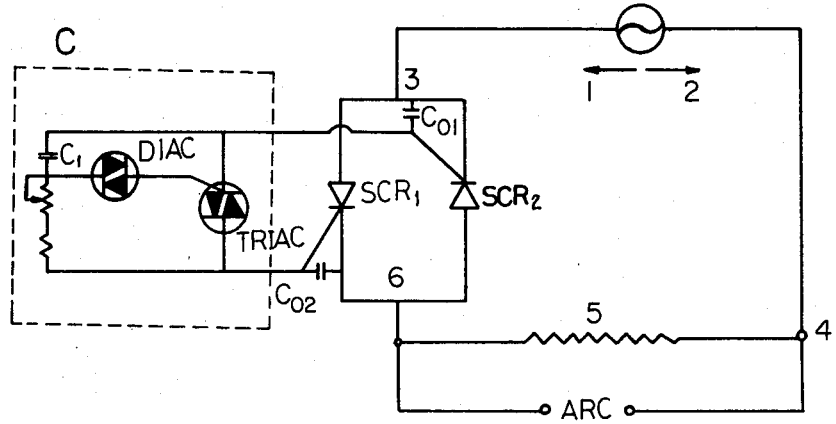
FIG. 2 is a schematic diagram illustrating a prototype of this invention applied to AC equipment.

With reference now to the drawings and particularly FIG. 2 thereof, the heart of this invention comprises two thyristors (SCRs), respectively represented by $SCR_1$ and $SCR_2$, in parallel connection, with their cathodes and anodes in reverse relationship, the gates of which SCRs are respectively connected to two of the terminals of a TRIAC so that the two thyristors (SCRs) can be gated on by the output of a small electic current from the TRIAC. When an AC power source is first connected to the circuit, the two thyristors (SCRs) the DIAC and TRIAC are not conductive or dormant. Application of an alternating current starts to charge a capacitor $C_1$ with capacitance of, for example, 0.1 $\mu F$ until the potential of the capacitor is higher than the triggering voltage of the DIAC, the DIAC is then triggered to produce a pulse, stronger than what is produced by the DIAC, capable of rendering one of the thyristers conductive during each half cycle to have the circuit allow a current to pass through to reach the load (arc).

For example, when AC current is first applied, suppose that during the first half cycle, the alternating current flows in the direction shown by arrow 1 and passes point 3, and reaches the cathode of $SCR_2$. Because the cathode-gate junction of an SCR has a relatively low reverse bias, say 5 volts, the current can thus pass through the cathode-gate of $SCR_2$ and reach the RC circuit. Capacitor $C_1$ thus begins to be charged and when the voltage across it reaches the breakover voltage of the DIAC, the DIAC is rendered conductive and capacitor $C_1$ starts to discharge, sending a pulse through the DIAC to the gate of the TRIAC. Now the TRIAC is rendered conductive and the current, which charged capacitor $C_1$, now finds its way through TRIAC, and reaches the gate of $SCR_1$. $SCR_1$ is thus rendered conductive, and now during the remainder of the half cycle, current can directly pass through $SCR_1$ to reach the load (arc), thus making a loop. Similarly, when the second half cycle begins, $SCR_1$ becomes reversely biased and returns to an off state. In this half cycle, the current flows in the direction indicated by arrow 2, following the route of points 4, 5 and 6, crossing the cathode gate junction of $SCR_1$ to reach the RC circuit. A chain of triggering reactions similar to the first cycle are caused, but in the second half cycle, it is $SCR_2$ which is conductive and through which the loading current passes. The capacitors $C_{01}$ and $C_{02}$ only serve to filter noise.

Thus this invention can be divided into two main portions, a main operating portion including the two SCRs and a controlling portion which is bracketed in the area outlined by dash lines, designated by C, for actuating the thyristers (SCRs) alternately.

When no rectification is desired, in other words, when applied to AC welding machines in which the purpose of this invention is only to serve as a voltage regulator in order to dispense with the need of a coil transformer, the embodiment of FIG. 2 will be satisfactory. When rectification is required to adapt to DC welding equipment, a few diodes may be inserted into the circuit to allow the current to pass in one direction only (see FIGS. 3A and 3B).

The alternative preferred embodiment as shown in FIG. 3B, in which four diodes are employed rather than two, provides the desired result as does the circuit shown in FIG. 3A. However, the embodiment shown in FIG. 3B is more practicable since the load of each individual diode is far smaller than is the case in the circuit of FIG. 3A when in operation. For this reason, the requisite quality of the diodes need not be as strictly controlled as compared to the two-diode-circuit shown in FIG. 3A, therefore saving the cost of component parts. In this embodiment, with reference to FIG. 3B, when a first half cycle of an alternating current is applied to and enters the circuit, to cause a chain of triggering already described hereinbefore, to turn on $SCR_1$, the electricity flows through $D_1$ to the load, and returns to the source via $D_2$. Similarly, the flow of AC current during the second half of the cycle follows the path of $D_4$, resistor and the arc, and then, $D_3$. Since $SCR_1$ is now reverse biased and therefore not in switch-on condition, the pulse can only find its way through $SCR_2$ which was previously in an off state in the first half of the cycle due to its reverse biased state and is now in a conductive condition because of being in a forward biased state, thus finishing its loop circuit.

Figure 1:
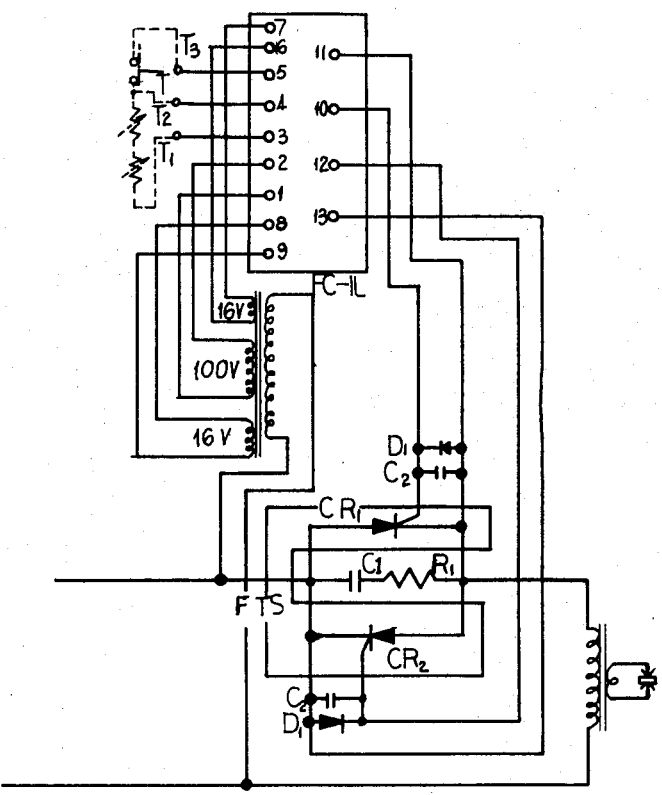
FIG. 1 is a schematic diagram illustrating a typical example of a prior art loop circuit of known AC-type arc welding equipment.

The principle of the invention is easily appreciated. Nevertheless, the advantages provided are substantial. Apart from the advantage that the bulky and cumbersome transformer can be dispensed with, the circuit has a structure that is simpler than that of prior art circuits, as for example, the circuit shown in FIG. 1. Further, the invention possesses all of the merits of the conventional DC arc welding equipment, yet is free of the defects thereof. Through the voltage-regulation provided by the present invention, a highly stable current either AC or DC, is produced, which is completely free of the risk of an accidental instantaneous peak of current that may damage the other vulnerable electronic parts. The invention can achieve synchronization with the perturbation of the power source, which none of the prior art can do. Free of the need for a transformer, the weight of the resulting assemble amounts to approximately one-eighth of that of conventional circuits, the volume being one-tenth thereof, thus greatly enhancing its convenience in operation, reducing the cost of production, and facilitating its conveyance. The equipment does not consume any power during a break between operations, even if the power source remains connected. The power factor can be as high as 95%, constrasted with the 45% power factor of conventional arc welding equipment. Thus an output of 15-30 volts of reduced voltage produced by the subject invention can do as much work as twice the voltage of conventional equipment.

Various changes may be made in the embodiments of the invention herein specially described without departing from or sacrificing any of the advantages of this invention or any features thereof, and nothing herein shall be construed as limitations upon this invention, its concept or structural embodiment as to the whole or any part thereof except as defined in the appended claims.

What is claimed is:

1. An electronic device for arc welding equipment having a load arc, comprising; a voltage regulating portion, and a controlling portion which controls said voltage regulating portion; said voltage regulating portion comprising two thyristors electrically connected to allow a first half cycle of alternating current to pass through one of the two thyristors and a second half cycle of said alternating current to pass through the other of said thyristors under the control of said controlling portion; said controlling portion comprising a RC circuit having a capacitor, changeable resistance, a DIAC, and a TRIAC in electrical connection with said voltage regulating portion such that the application of alternating current will first charge the capacitor of said RC circuit to a potential sufficient to trigger said DIAC which in turn triggers said TRIAC, said TRIAC in turn causing said thyristors to be alternately rendered conductive during alternate half-cycles.

2. The electronic device defined by claim 1, wherein the gates of said thyristors are directly connected to said controlling portion and said thyristors are connected in parallel with their cathodes and anodes disposed in opposing relationship.

3. The electronic device defined by claim 1, said voltage regulating portion further including a plurality of diodes operatively connected to form a bridge circuit, whereby the electronic device is adopted for use with direct current welding equipment.

4. The electronic device defined by claim 1 wherein said thyristors are SCRs each having an anode, a cathode and a gate, said TRIAC having a gate and two non-gate terminals, said SCRs being connected to each other in reverse parallel relationship with the anode and cathode of each SCR in serial connection with said load arc, the gates of said SCRs being connected to the TRIAC at different non-gate terminals thereof, the gate of said TRIAC being connected to said DIAC to have the TRIAC rendered conductive when the DIAC is rendered conductive, whereby changing of said capacitor of said RC circuit to the breakover voltage of said DIAC renders said DIAC conductive during each half cycle of alternating current applied to said device.

* * * * *

UNITED STATES PATENT AND TRADEMARK OFFICE
CERTIFICATE OF CORRECTION

PATENT NO. : 4,392,046

DATED : July 5, 1983

INVENTOR(S) : Huann-Jang Tzeng

It is certified that error appears in the above-identified patent and that said Letters Patent is hereby corrected as shown below:

Column 4, Line 61 "changing" should read --charging--

Signed and Sealed this

Fifteenth Day of November 1983

[SEAL]

Attest:

GERALD J. MOSSINGHOFF

Attesting Officer

Commissioner of Patents and Trademarks